(12) United States Patent
Bergara Urcelai (10) Patent No.: US 11,077,913 B2
(45) Date of Patent: Aug. 3, 2021

(54) BICYCLE FRAME WITH INTEGRATED SHOCK ABSORBER

(71) Applicant: ORBEA, S. COOP, Mallabia (ES)

(72) Inventor: Mikel Bergara Urcelai, Arrasate (ES)

(73) Assignee: ORBEA, S. COOP, Mallabia (ES)

( * ) Notice: Subject to any disclaimer, the term of this patent is extended or adjusted under 35 U.S.C. 154(b) by 227 days.

(21) Appl. No.: 16/441,830

(22) Filed: Jun. 14, 2019

(65) Prior Publication Data
US 2019/0389531 A1    Dec. 26, 2019

(30) Foreign Application Priority Data

Jun. 22, 2018 (EP) .................................... 18380006

(51) Int. Cl.
| | | |
|---|---|---|
| *B62K 19/30* | (2006.01) | |
| *B62K 25/20* | (2006.01) | |
| *B62K 3/06* | (2006.01) | |
| *B62K 25/04* | (2006.01) | |

(52) U.S. Cl.
CPC .............. *B62K 25/20* (2013.01); *B62K 3/06* (2013.01); *B62K 25/04* (2013.01); *B62K 2025/048* (2013.01); *B62K 2201/08* (2013.01)

(58) Field of Classification Search
CPC .......... B62K 25/20; B62K 3/06; B62K 25/30; B62K 19/30; B62K 3/04; B62K 2025/048; B62K 2201/08
USPC ........................................................ 280/285
See application file for complete search history.

(56) References Cited

U.S. PATENT DOCUMENTS

| | | | | | |
|---|---|---|---|---|---|
| 3,931,990 | A  * | 1/1976 | Knapp | ................... | B62K 25/30 |
| | | | | | 280/283 |
| 4,582,343 | A  * | 4/1986 | Waugh | ................... | B62K 25/30 |
| | | | | | 180/227 |
| 6,286,642 | B1 * | 9/2001 | Yi | .......................... | B62K 25/04 |
| | | | | | 188/269 |
| 2003/0234144 | A1* | 12/2003 | Fox | .......................... | F16F 9/06 |
| | | | | | 188/278 |
| 2005/0252330 | A1* | 11/2005 | Denk | ..................... | B62K 25/04 |
| | | | | | 74/502.2 |

(Continued)

FOREIGN PATENT DOCUMENTS

| | | | |
|---|---|---|---|
| DE | 10 2006 014 717 A1 | 10/2007 | |
| DE | 102006014717 A1 * | 10/2007 | ........... B62K 25/286 |

(Continued)

*Primary Examiner* — Ruth Ilan
*Assistant Examiner* — Myles A Harris
(74) *Attorney, Agent, or Firm* — Browdy and Neimark, PLLC (57) ABSTRACT

The invention relates to a bicycle frame (1) with a remote-controlled shock absorber (2) connected to the frame (1). The shock absorber (2) comprises two dials (3, 4) for adjusting the compression and rebound. The frame (1) is characterised in that it comprises a depression (9; 25) communicated with the outside of the frame (1) and provided with a window (12; 28) that communicates the depression (9; 25) with an inner part (8*b*; 18*b*) of the frame (1). An actuator element (7) for adjusting the compression dial (3) extends from the outside of the frame (1) towards the window (12; 28) passing through the inner part (8*b*; 18*b*) of the frame (1). The invention improves the integration of the rear suspension of the bicycle while simultaneously allows for easy adjustment of the compression dial (3) and the rebound dial (4).

11 Claims, 11 Drawing Sheets

(56) References Cited

U.S. PATENT DOCUMENTS

| | | | |
|---|---|---|---|
| 2010/0102531 A1 | 4/2010 | Graney et al. | |
| 2010/0327553 A1 | 12/2010 | Talavasek | |
| 2011/0095507 A1* | 4/2011 | Plantet | B62K 25/286 |
| | | | 280/277 |
| 2014/0361512 A1* | 12/2014 | Ishida | B62K 25/283 |
| | | | 280/284 |
| 2015/0197308 A1* | 7/2015 | Butora | B62K 25/20 |
| | | | 280/283 |
| 2016/0046346 A1* | 2/2016 | Juarez | B62K 19/18 |
| | | | 280/283 |
| 2016/0069415 A1* | 3/2016 | Murphy | F16F 9/50 |
| | | | 188/275 |
| 2016/0153515 A1* | 6/2016 | Ebersbach | F16F 9/462 |
| | | | 188/266.3 |
| 2017/0101155 A1* | 4/2017 | Tachibana | H04W 4/70 |
| 2017/0120983 A1* | 5/2017 | Komatsu | B62K 25/286 |
| 2019/0193804 A1* | 6/2019 | Alsop | B62K 19/06 |
| 2019/0233046 A1* | 8/2019 | McDonald | B62K 25/10 |

FOREIGN PATENT DOCUMENTS

| | | | | |
|---|---|---|---|---|
| EP | 3 029 350 A1 | 6/2016 | | |
| EP | 3029350 A1 * | 6/2016 | | F16F 9/512 |
| FR | 3012407 B1 * | 4/2017 | | B62K 25/286 |
| GB | 241957 A | 8/1926 | | |
| WO | 2015051472 A1 | 4/2015 | | |

\* cited by examiner

BICYCLE FRAME WITH INTEGRATED SHOCK ABSORBER

FIELD OF THE INVENTION

The invention relates to a bicycle frame with a remote-controlled rear shock absorber.

PRIOR ART

In the prior art, bicycles with double suspension already exist, with rear suspension by means of shock absorbers in the central or rear part of the bicycle frame and front suspension by means of a suspension fork for the front wheel.

The shock absorbers for the rear suspension are usually fixed to the rear part of the bicycle frame, in an arrangement parallel to the top tube or to the seat tube, which together with the down tube make up the frame of the bicycle. In this way, the shock absorber is exposed to the user so it is possible to adjust various parameters such as pressure, compression or rebound. On one hand, the pressure of the air chamber, called the preload, acts as a spring in the shock absorber and is adjusted for the user's weight by means of a valve. On the other hand, a rebound dial allows for the adjustment of the level of hydraulic suspension, varying the opening of an oil chamber to allow or prevent the passage of the oil. In this way, it is possible to control the speed with which the suspension extends. Frequently, this adjustment is made by turning a red dial on the top of the shock absorber. Lastly, the adjustment of the compression parameter is a complement to the rebound adjustment, as it is a system that is the same as the rebound, but vice versa. To this end, a second compression dial allows for the adjustment of the speed and force with which the suspension is compressed, allowing total or partial blockage of the suspension to increase the efficiency of pedalling when cycling. The activation of the compression can be made by means of a lever on the upper part of the shock absorber or by a remote control anchored to the handlebar and connected to the shock absorber by means of a cable.

There are various configurations for adjustment controls or dials for compression and rebound on the market. Usually, the shock absorber dials are arranged coaxially and superimposed in an area of the head of the shock absorber. In any way, the dials must be accessible to the user in order to be activated. This fact hinders the integration of the shock absorber into the frame of the bicycle, although this integration is desirable for a stylish appearance.

Some solutions known for improving the integration of the rear shock absorber are based on locating the shock absorber on the lower part of the bicycle frame, so that the shock absorber is partially integrated into the down tube and arranged parallel to the seat tube. However, in this type of solution, the compression and rebound dials are usually more difficult for the user to reach. In general, solutions aimed at improving the integration of the rear shock absorber provide less accessibility to the regulation dials.

It is an objective of the invention to provide a bicycle frame equipped with a rear shock absorber with suitable integration into the frame and, at the same time, good accessibility to the shock absorber adjustment controls.

BRIEF DESCRIPTION OF THE INVENTION

The object of the invention is a bicycle frame which, like other conventional bicycles, comprises a top tube, a down tube and a rear shock absorber with remote compression activation. The shock absorber is connected to the frame by means of two anchoring elements traversed by the longitudinal axis of the shock absorber. The shock absorber is provided with a compression dial and a rebound dial for regulating the operation of the shock absorber. The frame of the invention has the following particularity. One of the tubes of the frame, either the top tube or the down tube, has a depression that is communicated with the outside of the frame. This depression has the particularity of being delimited by an inner surface arranged inside the corresponding top or down tube. The inner surface comprises a perforation or window that communicates the depression with an inner part of the tube. Additionally, the bicycle integrating the frame of the invention is also provided with an actuator element for the regulation of the compression dial. This actuator element extends from the outside of the frame towards the window of the depression, passing through the inner part of the tube.

As a result of the configuration of the depression of the bicycle frame according to the invention, the integration of the shock absorber to the frame is improved. Therefore, the frame according to the invention allows the compression dial, normally located in the head of the shock absorber, to pass through the window towards the inside of the top tube or down tube and connect with the actuator element that extends inside the top tube or down tube. In this way, the compression dial is hidden inside the frame, improving the integration of the shock absorber.

The specific configuration of the depression and the window, depending on whether the shock absorber is connected to the top tube or to the down tube, will be detailed later, in the description of the different embodiments of the invention.

These forms of integrating the shock absorber greatly improve the integration of the shock absorber into the frame of the bicycle, because part of the shock absorber is partially integrated in the top tube or in the down tube and the compression dial is hidden inside the top tube or inside the down tube of the bicycle frame.

In addition, at the same time, all the dials of the shock absorber are accessible to the user and easily adjustable, depending on the requirements of the terrain where the bicycle is used. The need to adjust the compression dial and the rebound dial variously according to the type of terrain is well-known. On asphalted terrain, hard suspension is preferable. On mountainous terrain, softer suspension is preferable, to absorb the normal ridges or boulders of the terrain more smoothly and quickly. Therefore, the dials need to be accessible to the user at all times and this functional aspect is well solved by the invention.

Another advantage of the solution of the invention is that the greater integration of the shock absorber increases the free space available on the frame. This additional space can be put to other uses. In some embodiments, for example, it is possible to place at least one additional bottle cage on the bicycle's seat tube, complementing the bottle cage normally attached to the down tube of the bicycle frame. This possibility is very practical for mountain bikes since on long-distance routes in sparsely-inhabited areas it is in great demand and very necessary.

BRIEF DESCRIPTION OF THE FIGURES

The details of the invention can be seen in the accompanying figures, which are not intended to limit the scope of the invention.

DETAILED DESCRIPTION OF THE INVENTION

Figure 1:
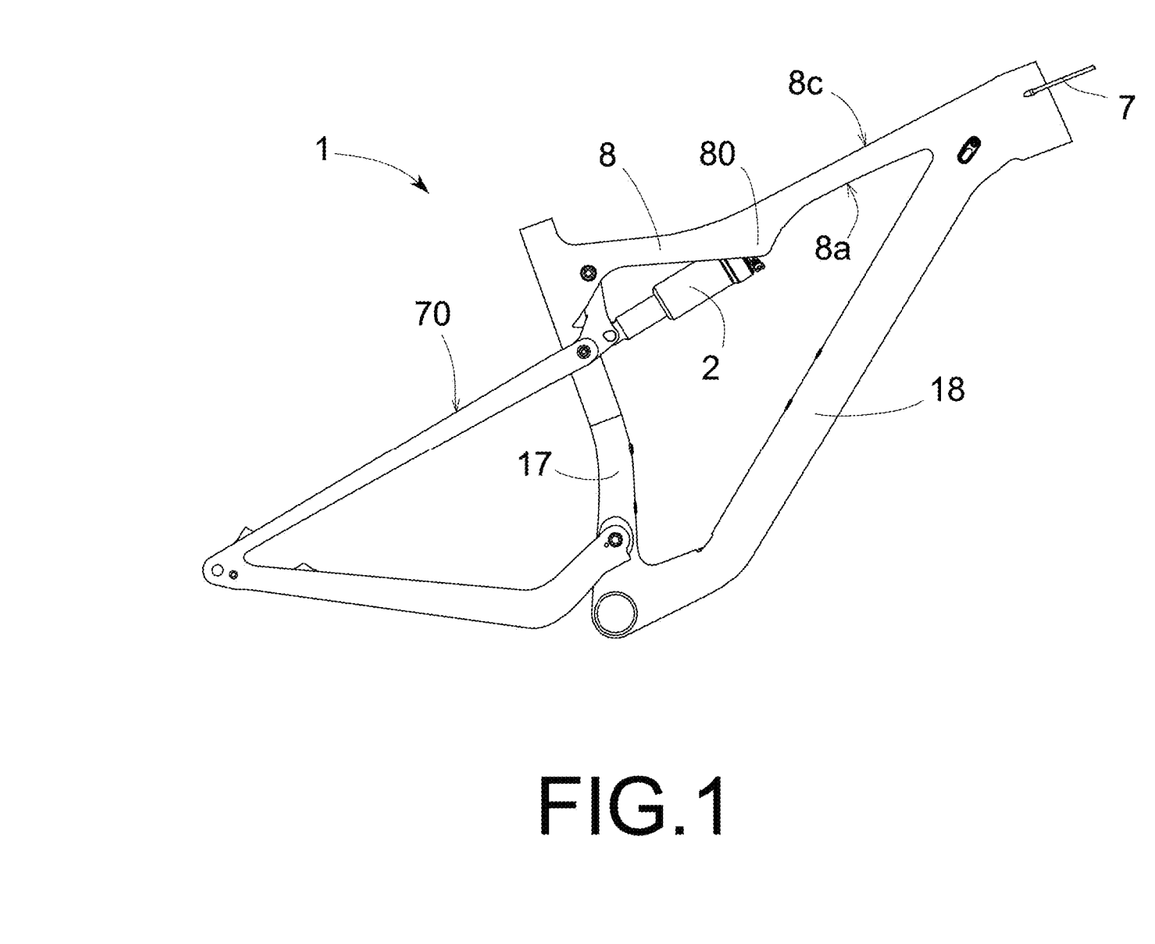
FIG. 1 shows a frontal view of a first embodiment of a bicycle frame with a rear shock absorber connected to the top tube of the frame.

FIG. 1 shows a first embodiment of a bicycle frame according to the invention. As seen in FIG. 1, the frame (1) has a top tube (8), a seat tube (17) and a down tube (18). The frame (1) comprises a rear shock absorber (2) connected to the frame (1) by means of two anchoring elements (2a, 2b) traversed by the longitudinal axis (5) of the shock absorber (2), which can be seen in more detail in FIG. 2. The invention is compatible with conventional shock absorbers, which usually have a valve (16) for preload adjustment, a compression dial (3) and a rebound dial (4) for adjusting the extension. These components allow the rear suspension of the bicycle to be adapted to any user or terrain, for a better experience.

As also seen in FIG. 1, the rear suspension includes a kinematic system (70). The kinematic system (70) is attached to the frame (1) of the bicycle and to the rear wheel of the bicycle so that, when jumping or crossing a bump, the shock absorber (2) absorbs and decreases the blow of the rear wheel against the floor. As can also be seen in the embodiment of FIG. 1, the shock absorber (2) is in this case partially integrated into the top tube (8) of the frame (1) of the bicycle. In other embodiments of the invention, which will be described later, it is also possible to improve the integration of the shock absorber (2) if said shock absorber (2) is connected to the down tube (18).

Figure 2:
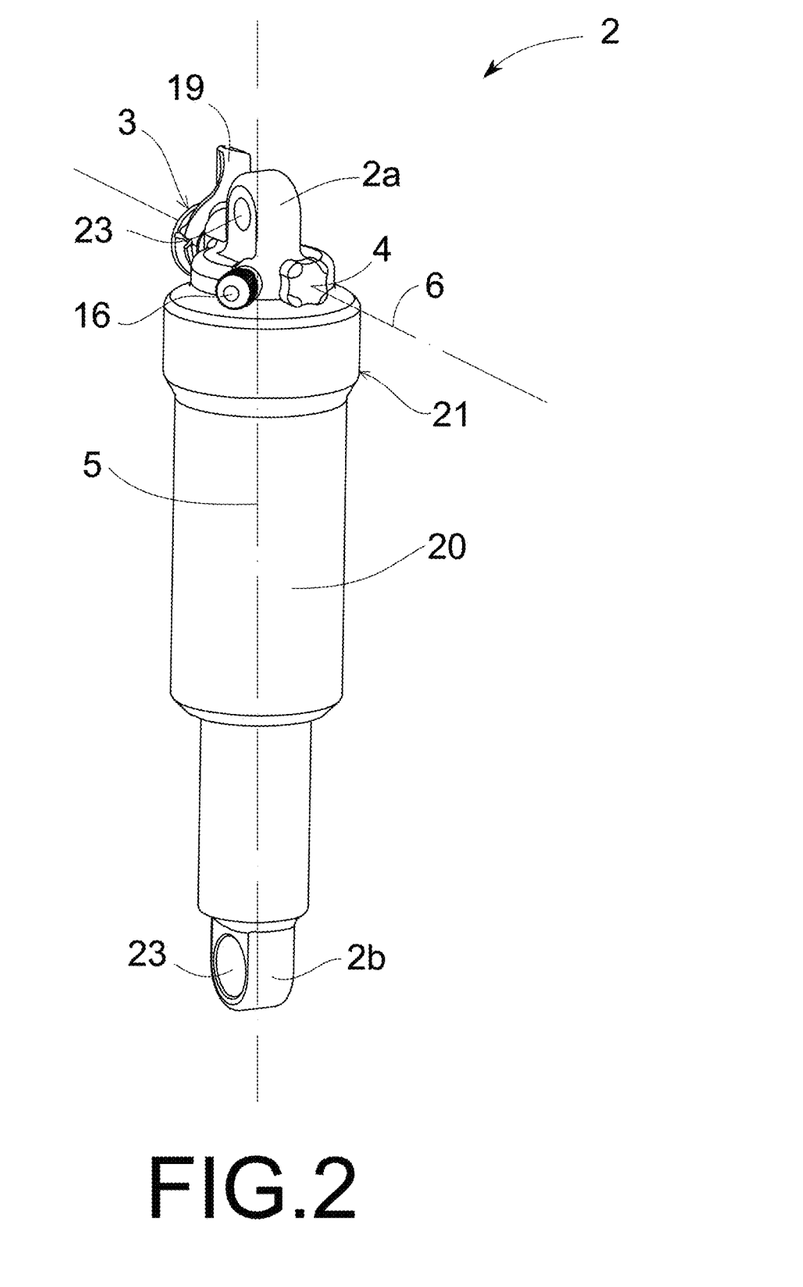
FIG. 2 shows a perspective view of the shock absorber of FIG. 1.

The shock absorber (2) of FIG. 2 comprises a cylindrical body (20) and a head (21). The valve (16), the compression dial (3) and the rebound dial (4) are located in the head (21). Additionally, the anchoring elements (2a, 2b) comprise a perforation (23) intended to house a system for attaching the shock absorber (2) to the frame (1) of the bicycle and to the kinematic system (70) of the rear suspension, as seen in FIGS. 1 and 2.

Optionally, as in this first embodiment corresponding to FIGS. 1 to 4, the compression dial (3) and rebound dial (4) are located in opposite positions, on either side of the head (21) of the shock absorber (2), according to a coaxial direction (6) substantially perpendicular to the longitudinal axis (5) as illustrated in FIG. 2.

The frame (1) of the invention has the particularity of including a depression (9) communicated with the outside of the frame (1). The depression (9) can be located in the top tube (8) or in the down tube (18). In either case, this depression (9) is communicated with the outside of the frame (1) and has a configuration that allows the partial integration of the shock absorber (2) so that it is possible to hide the compression dial (3) of the shock absorber (2) inside the frame (1), and connect it with an actuator element (7) guided through the interior of the frame (1). The compression dial (3) comprises, optionally, a control or lever (19) connected to the actuator element (7).

Figure 3:
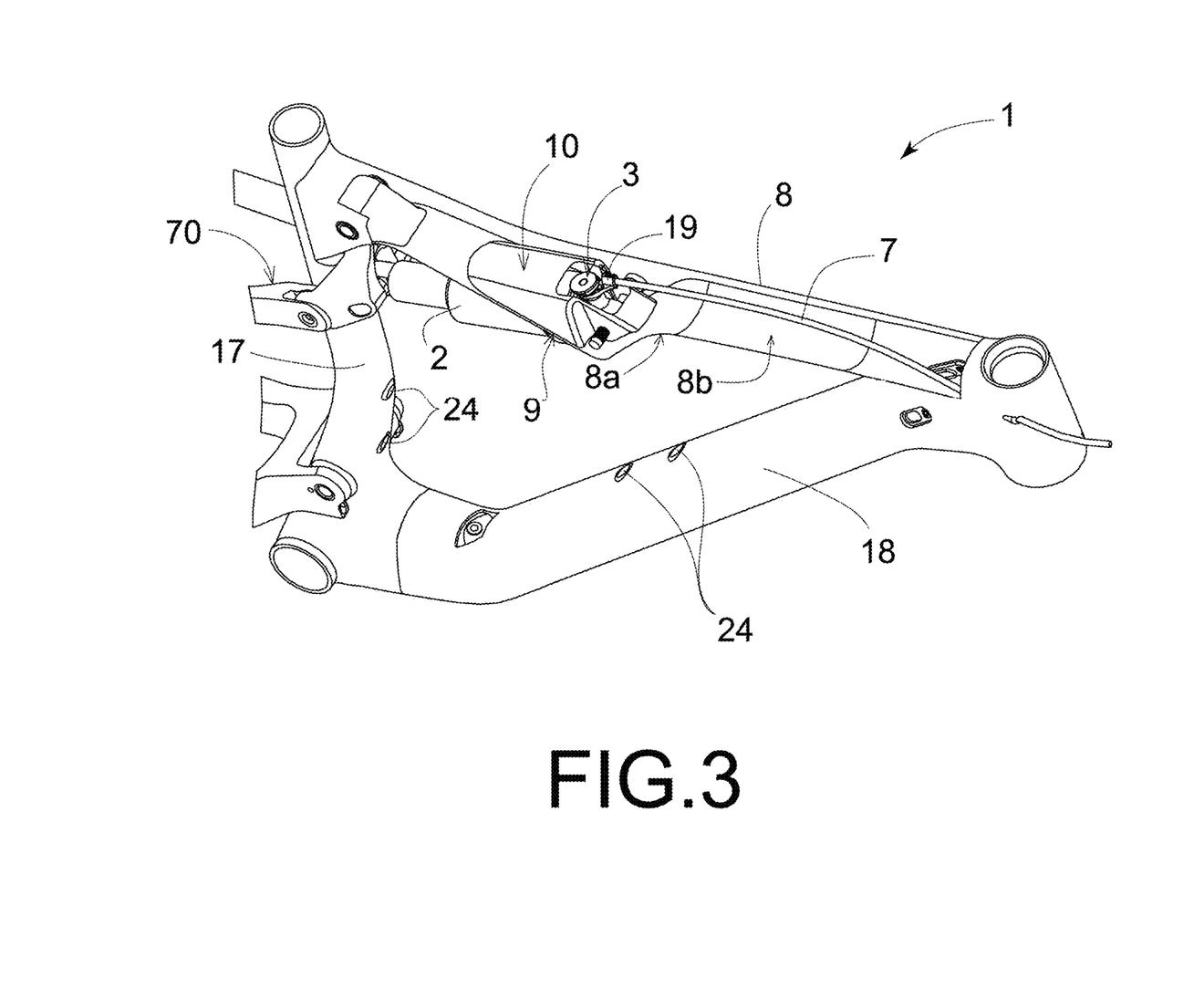
FIG. 3 shows a perspective view of the frame of FIG. 1, with a partial cross-section of the top tube, where the internal configuration of the top tube for the partial integration of the shock absorber can be seen.

FIG. 3 shows a perspective view of the specific embodiment of the frame (1) of FIG. 1, with a partial cut in the top tube (8) that makes it possible to see the internal configuration of the top tube (8) and the previously mentioned depression (9). As seen in FIG. 3, in this embodiment the depression (9) is communicated with the outside of the frame (1) and delimited by an internal surface (10). The internal surface (10) is convex in shape and is arranged in an inner part (8b) of the top tube (8). The top tube (8) comprises a V-shaped projection (80), as seen in FIG. 1 where the depression (9) is housed. The internal surface (10) is shown in detail in FIG. 4. This internal surface (10) has the particular aspect of comprising a perforation or window (12) that communicates the depression (9) with an inner part (8b) of the top tube (8) In this way, it is possible to guide an actuator element (7) for adjusting the compression dial (3), from the outside of the frame (1) towards the window (12) through the inner part (8b) of the tube (8), as can be seen in FIG. 3.

Figure 4:
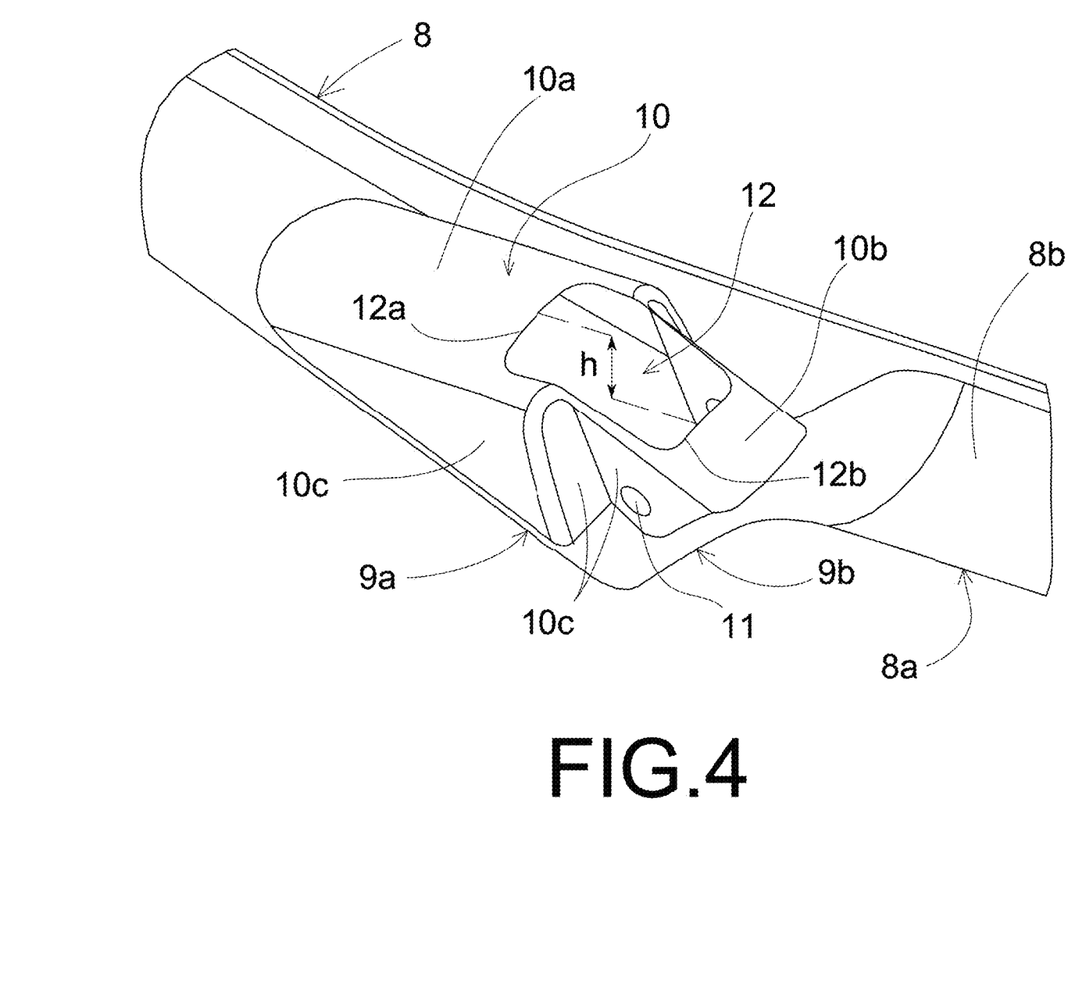
FIG. 4 is an enlarged view of the cross-section of FIG. 3 that illustrates in greater detail the configuration of the depression in the top tube.

As also illustrated in FIG. 4, optionally, the inner surface (10) has the following configuration. An upper face (10a) of the inner surface (10) extending mostly parallel to the longitudinal axis (5) of the shock absorber (2). A second inclined face (10b) extending from the upper face (10a) towards a lower part (8a) of the top tube (8). Finally, a plurality of lateral faces (10c) extending from the upper face (10a) and/or from the inclined face (10b) towards the lower part (8a) of the top tube (8), laterally enclosing the depression (9). In summary, the inner surface (10) delimits the convex depression (9) formed in the lower part (8a) of the top tube (8), this depression (9) being narrower than the top tube (8).

As can also be seen in FIG. 4, the depression (9) forms, on its outer side, an entrance area (9a) on one side of the projection (80) and an access area (9b) on the other side of the projection (80). The shock absorber (2) is inserted partially into the entrance area (9a) towards the top tube (8), so that it is partially hidden. The access area (9b) allows manual access to the head (21) of the shock absorber (2) in order to access and adjust the rebound dial (4) if necessary.

The depression (9) is intended to partially house the shock absorber (2), so that the head (21) penetrates the depression (9). As seen in FIGS. 3 and 4, therefore, the side faces (10c) of the inner surface (10) comprise housings (11) to anchor the shock absorber (2) by its anchoring area (2a) to the frame (1) of the bicycle.

Optionally, as in the embodiment of FIGS. 1 to 4, the window (12) comprises a first portion (12a) on the upper face (10a) of the internal surface (10) and a second portion (12b) on the inclined face (10b) of the inner surface (10). The configuration of the depression (9) and in particular of the window (12) are very advantageous because they make it possible to hide the compression dial (3) of the shock absorber (2) and allow the travel of the compression dial (3) inside the top tube (8) actuated by the actuator element (7) which is also integrated and partly hidden in the inner part (8b) of the top tube (8).

The compression parameter of the shock absorber (2) can be adjusted, for example, from a remote control on the handlebar of the bicycle which is connected to the actuator element (7), so that the compression can be adjusted without having to get off the bicycle. The actuator element (7) extends along the inner part (8b) of the top tube (8) to the window (12) through which the compression dial (3) protrudes, thus being partially hidden in the top tube (8). Optionally, the actuator element (7) can be guided from the front or from the sides of the front part of the frame (1) of the bicycle towards the window (12). Also optionally, the actuator element (7) can be a steel cable that operates mechanically. In other embodiments of the invention, the actuator element (7) can be operated hydraulically or electronically.

Furthermore, in the embodiment of FIGS. 1 to 4, as already mentioned, the rebound dial (4) is in a location opposite to the compression dial (3) according to the coaxial direction (6). In this way, the rebound dial (4) is exposed and accessible for manual adjustment, once the shock absorber (2) has been fixed to the frame (1) of the bicycle. This configuration is especially advantageous because it facilitates the adjustment of both dials (3, 4), which remain accessible to the user for adjustment.

Optionally, other embodiments of the invention are contemplated, in which the compression dial (3) and the rebound dial (4) are located in the head (21) of the shock absorber (2) in superimposed positions on the same side of the head (21). This configuration has the advantage of allowing both dials (3, 4) to be integrated into the depression (9) of the top tube (8), so that the integration of both dials (3, 4) is improved. In this embodiment, the rebound dial (4) is located above the compression dial (3) and both are located in the inner part (8b) of the top tube (8), passing through the window (12). In this case, the compression dial (3) is also adjusted remotely, as in the embodiment of FIGS. 1 to 4. However, for the adjustment of the rebound dial (4) when it is hidden in the inner part (8b) of the top tube (8) access for adjustment is not allowed, so there are several alternatives that are compatible with the invention.

Figure 5:
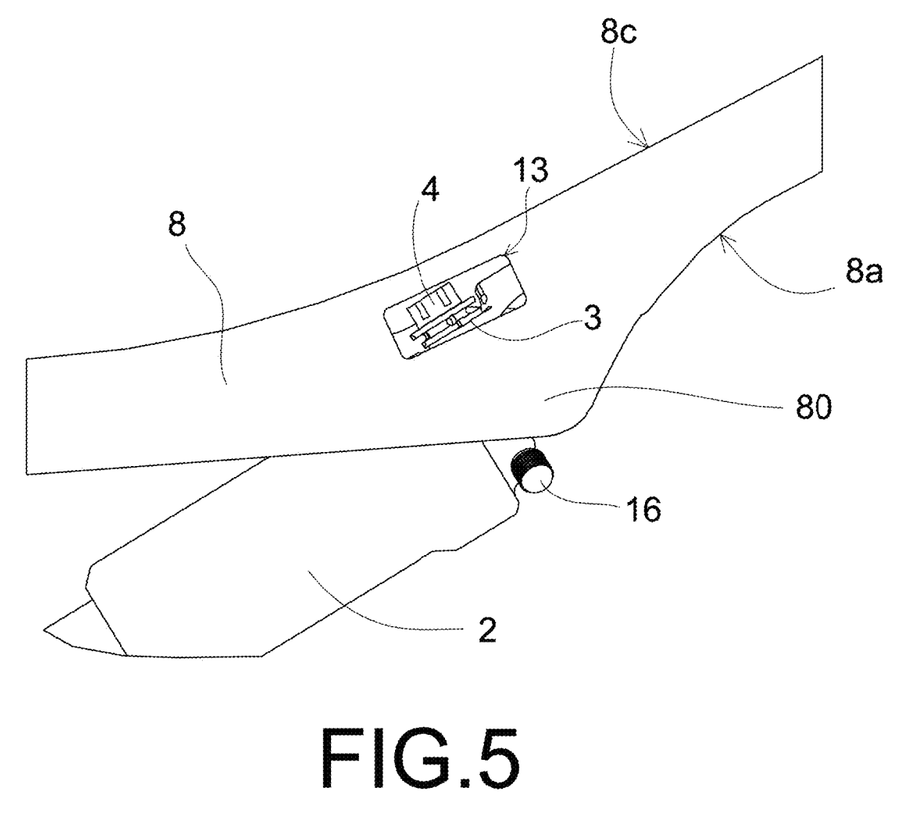
FIG. 5 shows a second embodiment of the bicycle frame, with a side window in the top tube of the frame.

A first alternative, to allow the adjustment of the rebound dial (4), is to make an external side window (13) in a lateral area of the top tube (8) where the depression (9) is located, as can be seen in the embodiment of FIG. 5. The window (13) thus allows adjustment of the rebound dial (4) manually or using a tool.

Figure 6:
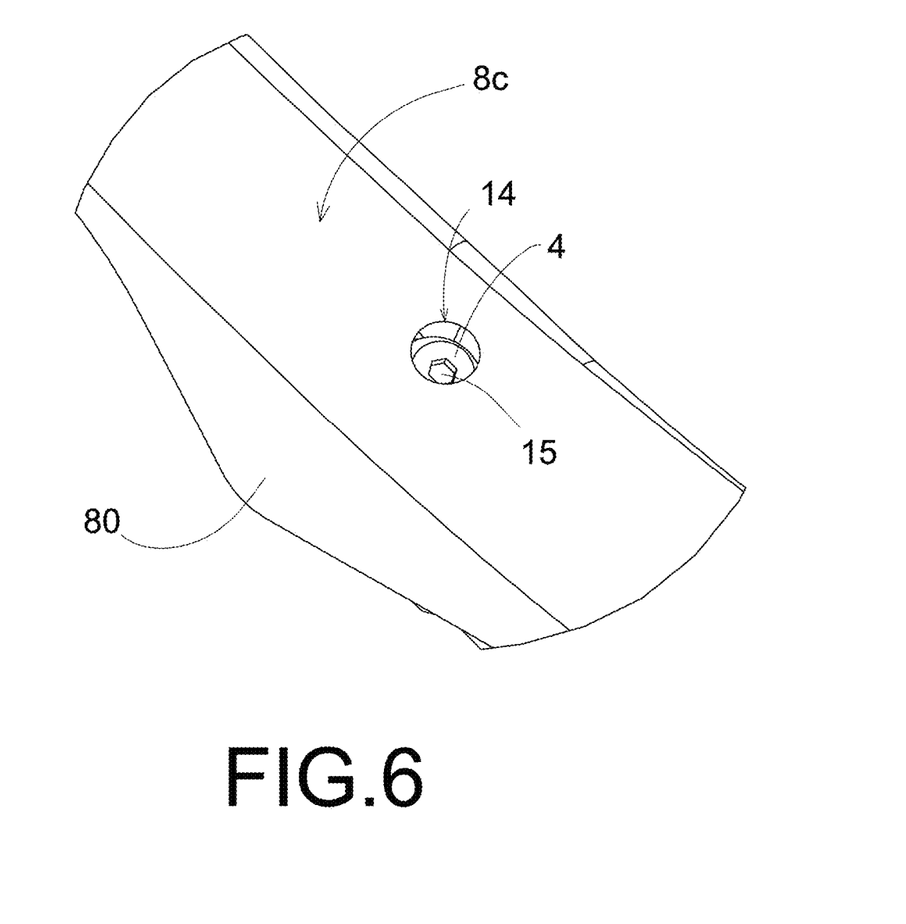
FIG. 6 shows a third embodiment of the bicycle frame, with a hole for accessing the rebound dial in the upper part of the top tube.

Another alternative for adjusting the rebound, when the compression dial (3) and rebound dial (4) are superimposed, is the one shown in the embodiment of FIG. 6. It consists in making a hole (14) located in this case in the upper part (8c) of the top tube (8). The hole (14) allows access from the outside of the frame (1) to the rebound dial (4). Additionally, a hexagonal hole (15) in the upper surface of the rebound dial (4) allows adjustment of the rebound dial (4) by means of an Allen key. The Allen key is inserted into the hole (14) and anchored in the hexagonal hole (15) so that with a simple twist the rebound dial (4) can be adjusted.

Figure 7:
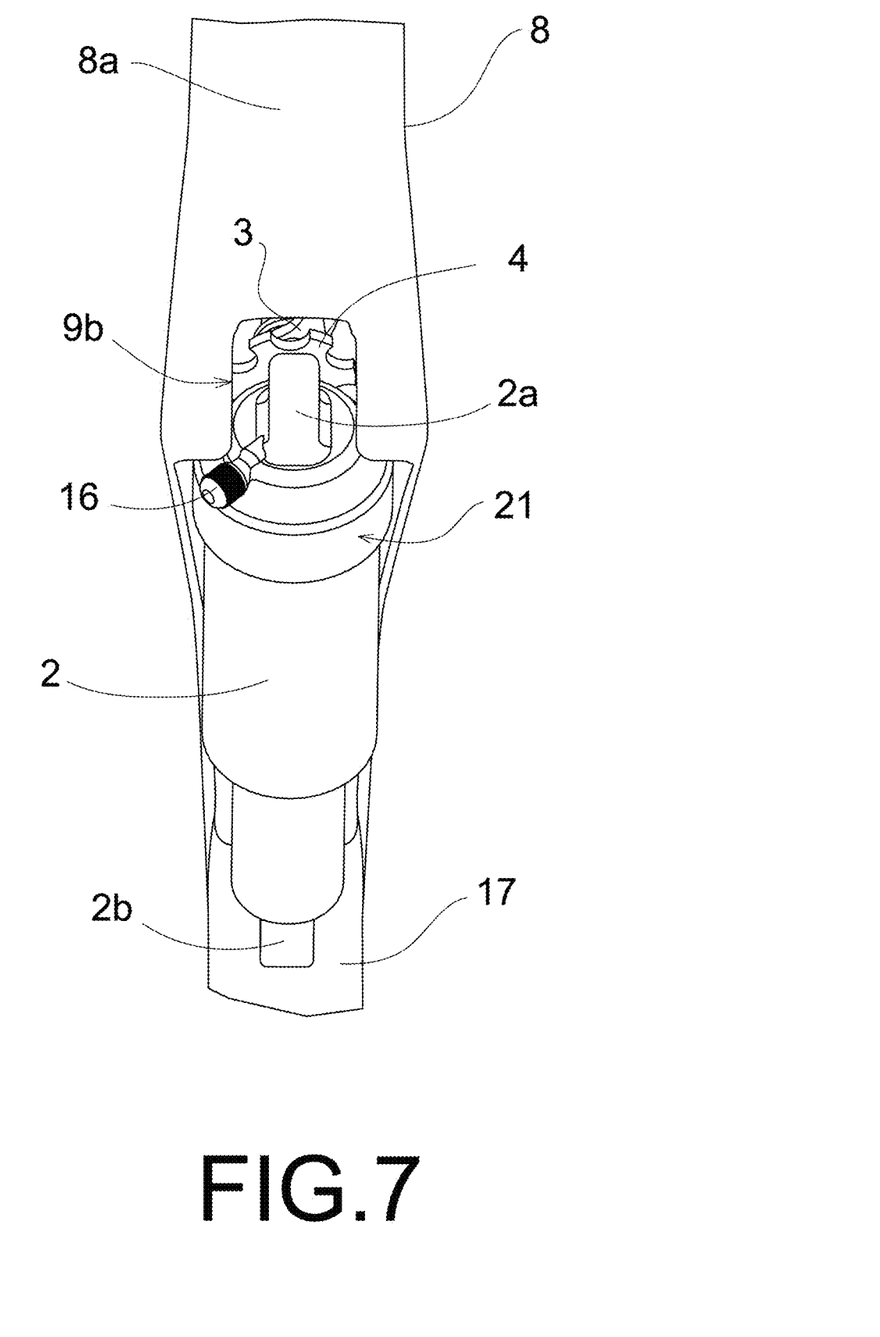
FIG. 7 shows a detailed view of a fourth embodiment of the bicycle frame, where the rebound dial has a toothed wheel design.

Another embodiment, for a superimposed positioning of dials (3) and (4), is based on a rebound dial (4) with a toothed wheel design, as shown in FIG. 7. In this case, the rebound dial (4) is placed between the shock absorber (2) and the compression dial (3). The adjustment of the rebound dial (4) is carried out manually through the access area (9b) of the depression (9).

Figure 8:
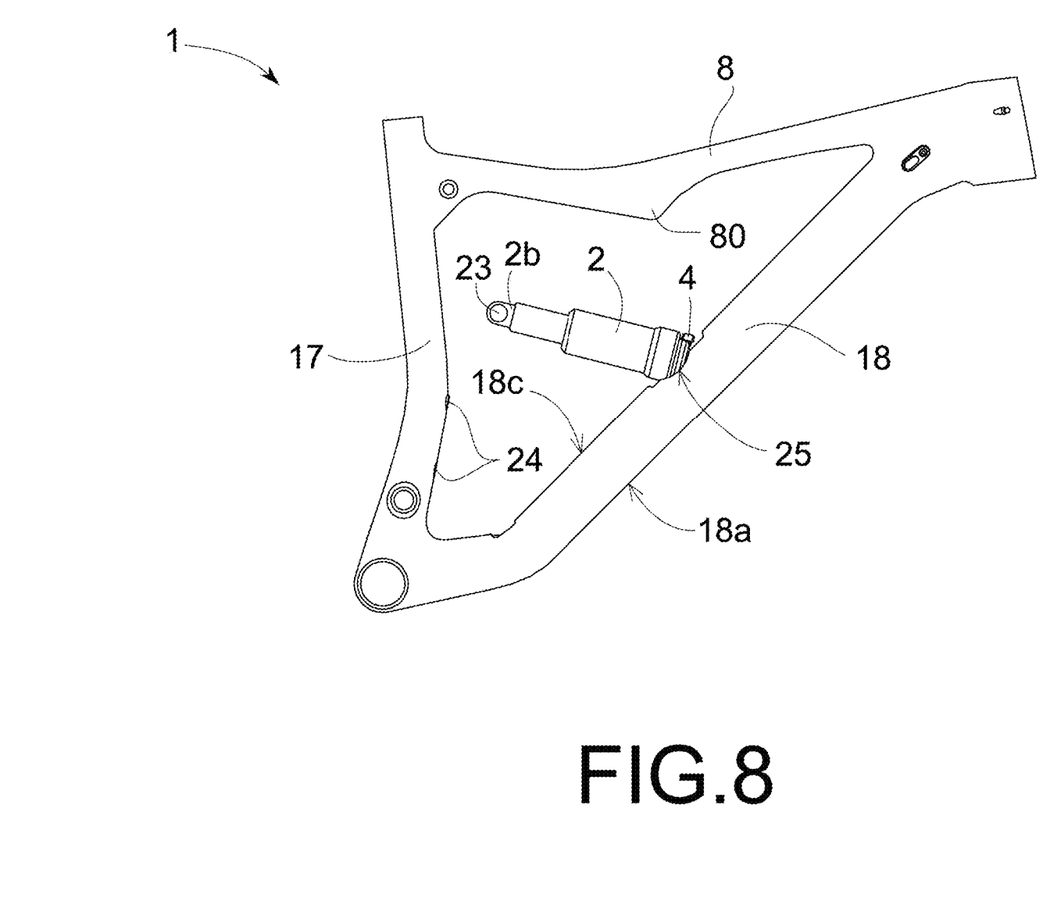
FIG. 8 shows a front view of a fifth embodiment of the invention, in this case with the shock absorber for the rear suspension connected to the down tube of the frame.

In other embodiments of the invention, the shock absorber (2) is connected to the down tube (18), as seen in FIG. 8. This integration solution is also compatible with the compression dial (3) and rebound dial (4) located in both superimposed or opposite arrangements on the head (21) of the shock absorber (2). In the cases in which the dials (3, 4) have a superimposed arrangement, the down tube (18) can optionally be provided with a side window or with a hole in the lower part (18a) of the down tube (18) to enable the adjustment of the rebound dial (4), as seen in previous embodiments. In this case, the side window and the hole of the down tube (18) are not drawn in FIGS. 8 to 11 of this embodiment.

As illustrated in the embodiment of FIGS. 8 to 11, the depression (25) may be located in an upper part (18c) of the down tube (18). In this case, an inner surface (26) delimiting the depression (25) is arranged inside the down tube (18). According to an optional configuration, this inner surface (26) comprises a concave face (26a) and at least two side faces (26b). The side faces (26b) extend from the concave face (26a) towards the upper part (18c) of the down tube (18) laterally enclosing the depression (25). The perforation or window (28) is made in the concave face (26a) of the inner surface (26) and the compression dial (3) passes through it, as seen in detail in FIG. 10.

Figure 10:
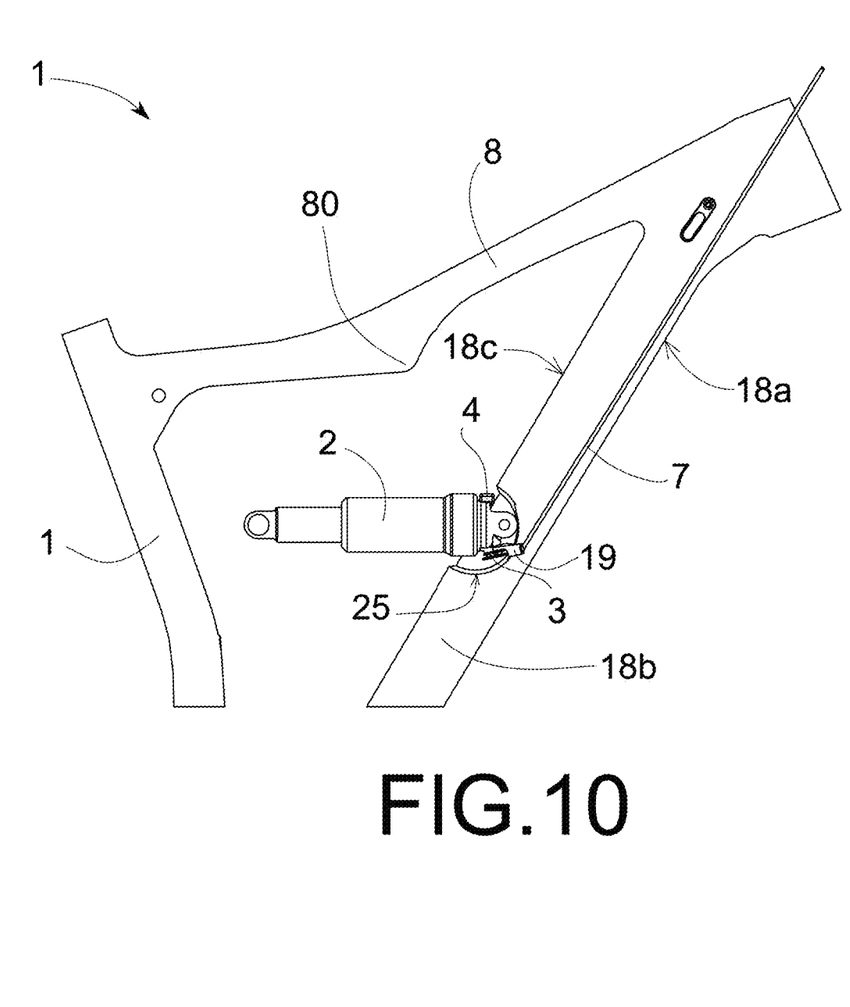
FIG. 10 shows a front view of the frame of FIG. 8 with a cut in the down tube that shows the integration of the shock absorber to the down tube in greater detail.

For this embodiment of FIG. 10, the head (21) of the shock absorber (2) penetrates the depression (25) and the compression dial (3) passes through the window (28), into the inner part (18b) of the down tube (18). The remote actuator element (7) extends from the compression dial (3) towards a remote control on the handlebar, which is used to adjust the compression of the shock absorber (2). The rebound dial (4) is adjusted manually from the upper part (18c) of the down tube (18).

Figure 9:
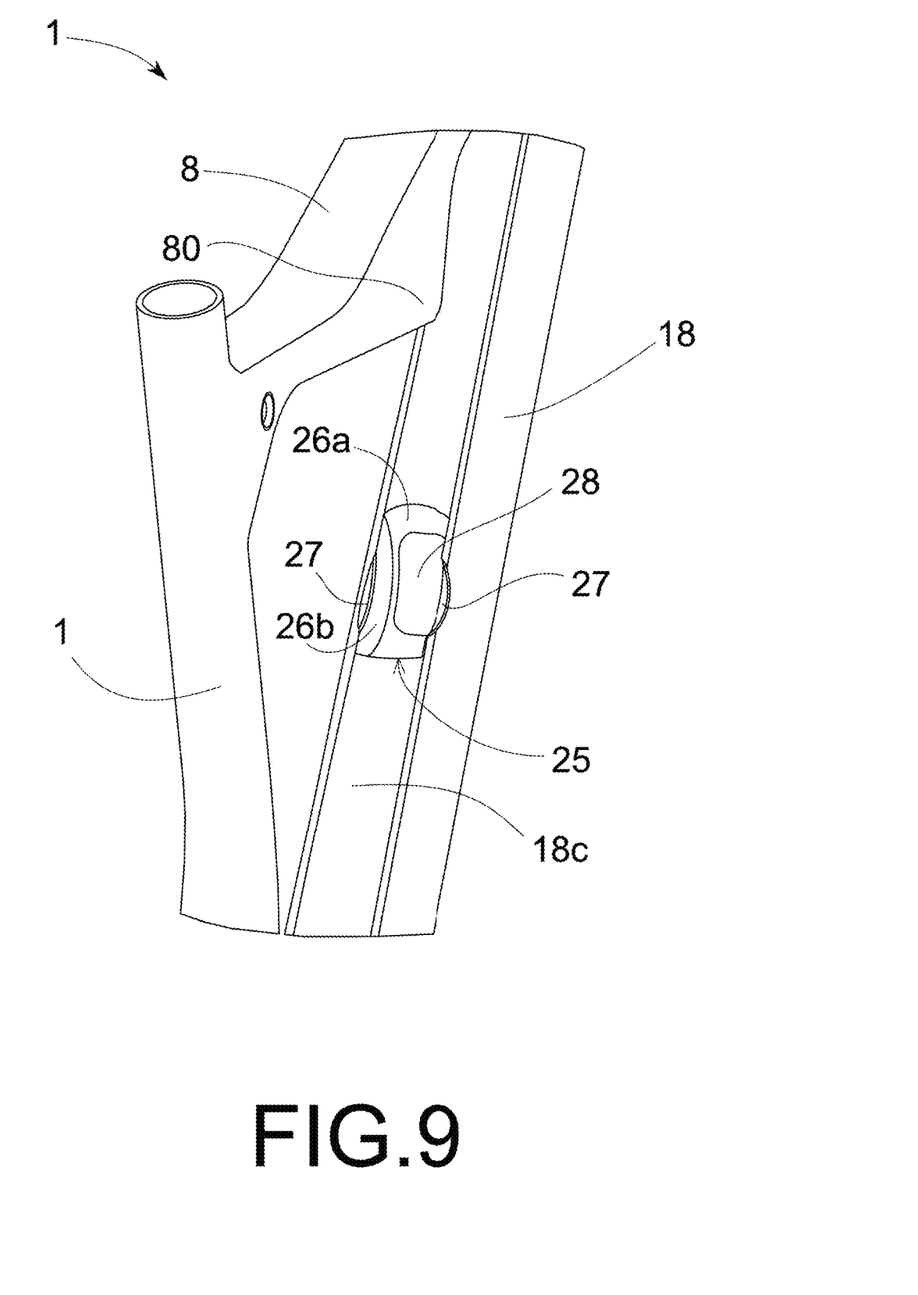
FIG. 9 shows a detailed perspective view of the depression on the down tube of FIG. 8.

Optionally, the side faces (26b) comprise a recess (27) to facilitate the fitting of the shock absorber (2), as seen in FIG. 9.

Figure 11:
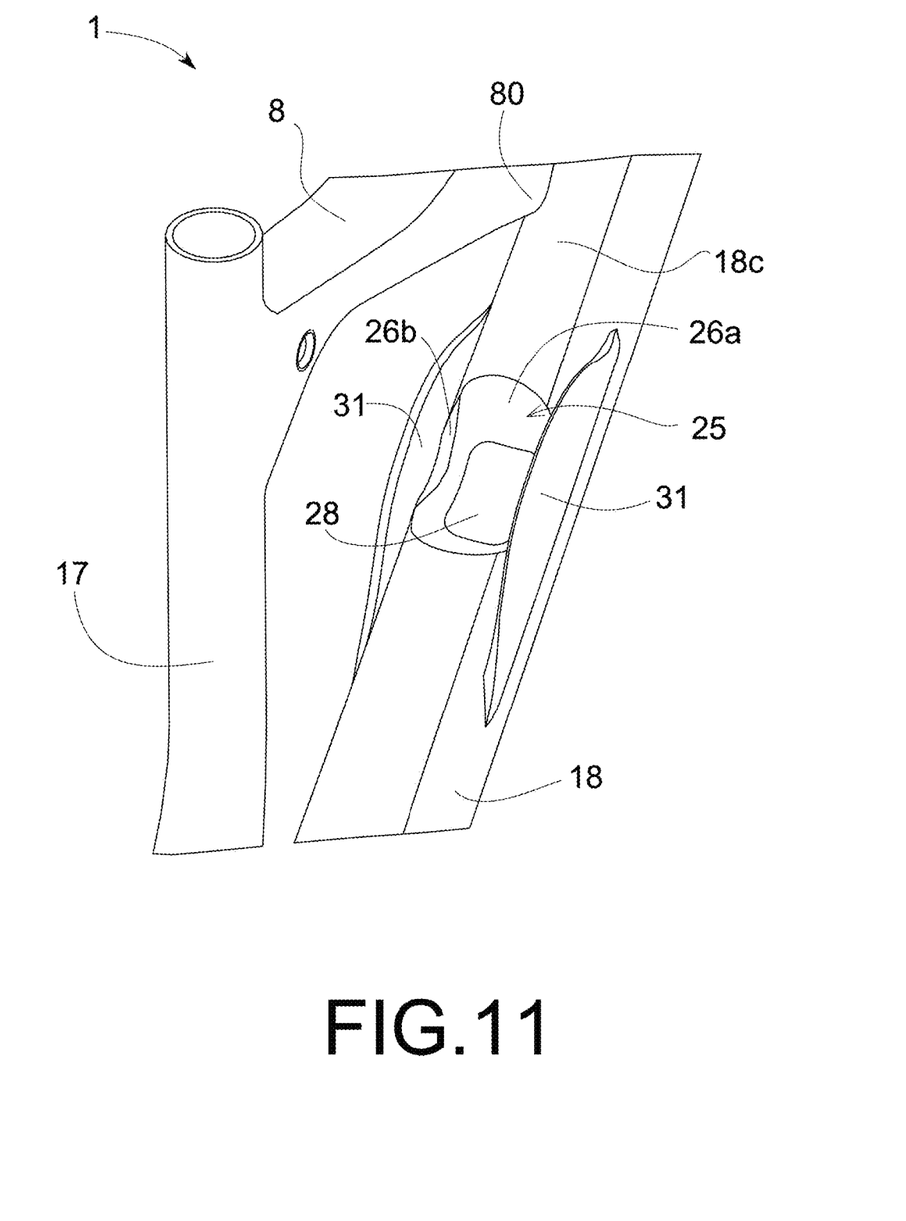
FIG. 11 shows a detailed view of an alternative of the depression configuration of FIG. 8.

Also optionally, as illustrated in FIG. 11, the down tube (18) includes side flaps (31) projecting towards the upper part (18c) of the down tube (18), partially covering the shock absorber (2).

Other embodiments of the invention are contemplated in which the depression may have another geometric configuration. In these embodiments, the compression dial (3) also passes through the window (28) penetrating the inner part (18b) of the down tube (18).

The invention claimed is:
1. Frame (1) for a bicycle, comprising a top tube (8), a down tube (18) and a remote-controlled rear shock absorber (2), being the shock absorber (2) connected to the frame (1) by means of two anchoring elements (2a, 2b) traversed by a longitudinal axis (5) of the shock absorber (2) and comprising the shock absorber (2) at least one compression dial (3) and a rebound dial (4), wherein the frame (1) is characterized in that:
one of the tubes (8; 18), the top tube (8) or the down tube (18), comprises a depression (9; 25) communicated with the outside of the frame (1) and delimited by an inner surface (10; 26), wherein
the inner surface (10; 26) is arranged inside the tube (8; 18) and comprises a window (12; 28) that communi- cates the depression (9; 25) with an inner part (8b; 18b) of the tube (8; 18), and wherein the bicycle comprises an actuator element (7) for adjusting the compression dial (3), wherein the actuator element (7) extends from the outside of the frame (1) towards the window (12; 28) passing through the inner part (8b; 18b) of the tube (8; 18).

2. Frame (1), according to claim 1, wherein the rebound dial (4) and the compression dial (3) are located in a head (21) of the shock absorber (2) and in opposite positions, in either sides of the head (21), according to a coaxial direction (6) substantially perpendicular to the longitudinal axis (5).

3. Frame (1), according to claim 1, in which the rebound dial (4) and the compression dial (3) are located in a head (21) of the shock absorber (2) and in superimposed positions in one side of the head (21).

4. Frame (1), according to claim 3, wherein the tube (8; 18) comprises an external side window to allow access from the outside of the frame (1) to the rebound dial (4).

5. Frame (1), according to claim 3, wherein the tube (8; 18) comprises a hole, located in an upper part (8c) or in a lower part (18a) of the tube (8; 18), to allow the actuation of the rebound dial (4).

6. Frame (1), according to claim 1, wherein the depression (9) is located in a lower part (8a) of the top tube (8) and wherein the inner surface (10) is arranged inside the top tube (8) and comprises:

an upper face (10a) substantially parallel to the longitudinal axis (5) of the shock absorber (2), an inclined face (10b) extending from the upper face (10a) towards the lower part (8a) of the top tube (8) and a plurality of side faces (10c) extending from the upper face (10a) and from the inclined face (10b) towards the lower part (8a) of the top tube (8) laterally enclosing the depression (9), and wherein the window (12) comprises a first portion (12a) on the upper face (10a) and a second portion (12b) on the inclined face (10b).

7. Frame (1), according to claim 1, wherein the depression (25) is located in an upper part (18c) of the down tube (18) and wherein the inner surface (26) is arranged inside the down tube (18) and comprises:

a concave face (26a) and at least two lateral faces (26b) extending from the concave face (26a) towards the upper part (18c) of the down tube (18), laterally enclosing the depression (25), and wherein the window (28) is made in the concave face (26a).

8. Frame (1), according to claim 7, wherein the side faces (26b) comprise a recess (27) to facilitate the fitting of the shock absorber (2).

9. Frame (1), according to claim 7, wherein the down tube (18) comprises side flaps (31) projecting towards the upper part (18c) of the down tube (18) partially covering the shock absorber (2).

10. Frame (1), according to claim 1, wherein the actuator element (7) is a mechanically, hydraulically or electronically actuated cable.

11. Frame (1), according to claim 1, wherein the actuator element (7) is guided from the front part or from the sides of the front part of the frame (1) towards the window (12; 28).

* * * * *